(12) United States Patent
Miglietti et al.

(10) Patent No.: US 9,056,372 B2
(45) Date of Patent: Jun. 16, 2015

(54) EXTENDING USEFUL LIFE OF A COBALT-BASED GAS TURBINE COMPONENT

(75) Inventors: Warren Miglietti, Jupiter, FL (US); John Roderick, Hobe Sound, FL (US)

(73) Assignee: ALSTOM TECHNOLOGY LTD, Baden (CH)

( * ) Notice: Subject to any disclaimer, the term of this patent is extended or adjusted under 35 U.S.C. 154(b) by 429 days.

(21) Appl. No.: 12/902,902

(22) Filed: Oct. 12, 2010

(65) Prior Publication Data

US 2012/0084980 A1 Apr. 12, 2012

(51) Int. Cl.
*B23P 6/04* (2006.01)
*B23K 35/00* (2006.01)
*B23K 35/30* (2006.01)
*C21D 9/50* (2006.01)
*C22C 19/07* (2006.01)
*C22F 1/10* (2006.01)
*C22F 1/18* (2006.01)
*F01D 5/28* (2006.01)
*F01D 9/02* (2006.01)
*C21D 6/00* (2006.01)

(52) U.S. Cl.
CPC ............. *B23P 6/045* (2013.01); *Y10T 29/49318* (2015.01); *B23K 35/007* (2013.01); *B23K 35/3046* (2013.01); *C21D 6/007* (2013.01); *C21D 9/50* (2013.01); *C22C 19/07* (2013.01); *C22F 1/10* (2013.01); *C22F 1/18* (2013.01); *F01D 5/286* (2013.01); *F01D 9/02* (2013.01); *F05C 2201/0463* (2013.01); *F05D 2230/40* (2013.01); *F05D 2300/13* (2013.01)

(58) Field of Classification Search
CPC .............. B23P 6/00; B23P 6/002; B23P 6/04; B23P 6/007; C22F 1/10; C22F 1/14; C22F 1/16; B23K 35/3046; B23K 1/0018; F01D 5/005; C22C 19/00
USPC ............... 29/889.21, 402.18, 402.16, 402.13, 29/402.09; 419/31; 23/300; 148/112
See application file for complete search history.

(56) References Cited

U.S. PATENT DOCUMENTS 3,536,542 A * 10/1970 Murphy et al. ............... 148/675
3,576,681 A * 4/1971 Barker et al. .................. 148/410
4,116,723 A * 9/1978 Gell et al. ...................... 148/555
4,676,846 A * 6/1987 Harf ................................ 75/246
5,106,010 A * 4/1992 Stueber et al. ................ 228/232

(Continued)

OTHER PUBLICATIONS

"Standard Specification for Castings, Iron, Cobalt, and Nickel-Base Alloy, for High Strength at Elevated Temperatures," American Society for Testing and Materials Designation A 567/A 567M-84, 16 pages.

(Continued)

*Primary Examiner* — David Bryant
*Assistant Examiner* — Lee A Holly
(74) *Attorney, Agent, or Firm* — Shook, Hardy & Bacon L.L.P.

(57) ABSTRACT

A method of extending the useable life of a gas turbine component fabricated from a cobalt-based alloy is disclosed. The method includes applying a rejuvenation process to the alloy where the alloy is placed in a protected atmosphere and heated to three different elevated temperatures and held at the elevated temperatures for approximately four hours each. Application of the rejuvenation process allows gas turbine components to be returned to service for at least one more service interval of approximately 24,000 operating hours.

8 Claims, 8 Drawing Sheets

(56) References Cited

U.S. PATENT DOCUMENTS

| | | | | |
|---|---|---|---|---|
| 5,437,737 | A | * | 8/1995 | Draghi et al. .................. 148/23 |
| 5,498,484 | A | * | 3/1996 | Duderstadt .................. 428/633 |
| 5,522,134 | A | * | 6/1996 | Rowe et al. .................. 29/889.1 |
| 5,549,767 | A | * | 8/1996 | Pietruska et al. ............. 148/512 |
| 5,741,378 | A | * | 4/1998 | Pietruska et al. ............. 148/674 |
| 5,794,338 | A | * | 8/1998 | Bowden et al. ............. 29/889.1 |
| 5,806,751 | A | * | 9/1998 | Schaefer et al. ............. 228/119 |
| 5,897,801 | A | * | 4/1999 | Smashey et al. ...... 219/137 WM |
| 5,922,150 | A | * | 7/1999 | Pietruska et al. ............. 148/674 |
| 6,503,349 | B2 | * | 1/2003 | Pietruska et al. ............. 148/562 |
| 6,530,971 | B1 | * | 3/2003 | Cohen et al. .................. 75/254 |
| 6,629,368 | B2 | * | 10/2003 | Schnell et al. ............. 29/889.1 |
| 7,653,995 | B2 | * | 2/2010 | Morin .......................... 29/889.1 |
| 7,789,288 | B1 | * | 9/2010 | Johnson et al. ............. 228/119 |
| 2006/0081685 | A1 | * | 4/2006 | Kinstler ........................ 228/119 |
| 2007/0175546 | A1 | * | 8/2007 | Hoppe et al. .................. 148/428 |
| 2008/0179381 | A1 | * | 7/2008 | Minor et al. .................. 228/119 |
| 2008/0213617 | A1 | * | 9/2008 | Taylor et al. .................. 428/603 |
| 2009/0113706 | A1 | * | 5/2009 | Emilianowicz et al. . 29/888.011 |
| 2010/0107871 | A1 | * | 5/2010 | Mantkowski ..................... 95/92 |

OTHER PUBLICATIONS

"Combustion Turbine Guidelines: Conventional and Advanced Machines", Mar. 2005, 50 pages, vol. 8, General Electric MS9001 Model E, Electric Power Research Institute, Palo Alto, California, EPRI document report # 1005032.

Sims, et al., "SUPERALLOYS II—High Temperature Materials for Aerospace and Industrial Power," p. 153, Aug. 1987.

Balevic, et al., "Heavy-Duty Gas Turbine Operating and Maintenance Considerations", GER 3620L, 60 pages, Nov. 2009, GE Energy, Atlanta, Georgia.

* cited by examiner

EXTENDING USEFUL LIFE OF A COBALT-BASED GAS TURBINE COMPONENT

CROSS-REFERENCE TO RELATED APPLICATIONS

Not applicable.

TECHNICAL FIELD

The present invention relates to gas turbine engines. More particularly, embodiments of the present invention relate to repairing and heat treating the alloy of a gas turbine component to extend the component life.

BACKGROUND OF THE INVENTION

A gas turbine engine operates to produce mechanical work or thrust. For land-based gas turbine engines, a generator is typically coupled to the engine through an axial shaft, such that the mechanical work is harnessed to generate electricity. A typical gas turbine engine comprises a compressor, at least one combustor, and a turbine, with the compressor and turbine coupled together through the axial shaft. In operation, air passes through the compressor, where the pressure of the air increases and then fuel is mixed with the compressed air in the combustion section. The combustion section can comprise one or more combustion chambers. The fuel and air mixture is ignited in the combustion chamber and hot combustion gases produced pass into the turbine and drive the turbine. As the turbine rotates, the compressor turns, since they are coupled together. The turning of the shaft also drives the generator.

The turbine components, which are fabricated from a variety of high-temperature alloys, are exposed to elevated operating temperatures (often upwards of 2000° F.) and pressures for a sustained period of time. Because of the elevated temperatures, pressure, vibrations, and cycling that occurs during operation of the gas turbine engine, the turbine components are known to crack, mainly as a result of thermo-mechanical fatigue (TMF). While some crack repairs can be made utilizing processes such as welding or brazing, the turbine components also have a limited component life as determined by the original equipment manufacturer. For example, according to GER 3620, a technical publication of the General Electric Company entitled Heavy Duty Gas Turbine Operating and Maintenance Considerations, gas turbine vanes of a General Electric Frame 7FA Gas Turbine Engine, which are fabricated from FSX-414, a cobalt-based alloy, are limited to two cycles of 24,000 operating hours, or a total of 48,000 hours before being discarded. These airfoil components are deemed no longer serviceable and cannot be returned to operation. As such, operators of the gas turbine engine must purchase replacement parts, but extending the usable life of these components will provide significant cost savings.

SUMMARY

Embodiments of the present invention are directed towards repair techniques and processes for gas turbine components fabricated from a cobalt-based alloy, such as FSX-414, X-40, X-45, and WI-52 so as to extend the usable life of the component. The embodiments of the present invention include methods for rejuvenating a cobalt-based gas turbine component including elevating the cobalt-based alloy to a heat-treat temperature higher than previously considered acceptable.

In an embodiment of the present invention, a method of rejuvenating a cobalt-based alloy is disclosed in which the alloy is heated in a protected atmosphere, preferably in a hydrogen or vacuum environment, to approximately 2200° F.-2250° F. for approximately 4 hours, then heated in the protected atmosphere at 1950° F.-2000° F. for approximately another 4 hours, and then heated in the protected atmosphere at 1775° F.-1825° F. for approximately 4 hours.

In an alternate embodiment of the present invention, a method of rejuvenating a cobalt-based alloy is disclosed in which the alloy is heated in a protected atmosphere, preferably in a hydrogen or vacuum environment, to approximately 2200° F.-2250° F. for approximately 4 hours, then actively cooled to below approximately 500° F. and heated in the protected atmosphere to 1950° F.-2000° F. for approximately another 4 hours. The alloy is cooled to below approximately 500° F. and then heated in the protected atmosphere at 1775° F.-1825° F. for approximately 4 hours, where it is then cooled to below approximately 500° F.

In another embodiment of the present invention, a method of extending a useable life of a gas turbine component having one or more crack locations is disclosed. The method comprises heating the component in a protected atmosphere to 2200° F.-2250° F. for approximately 4 hours, welding closed the one or more cracks, heating the component a second time in a protected atmosphere to 2200° F.-2250° F. for approximately 4 hours, then heating the component in a protected atmosphere to 1950° F.-2000° F. for approximately 4 hours, and heating the component in a protected atmosphere to 1775° F.-1825° F. for approximately 4 hours.

In yet another embodiment of the present invention, a method of extending the useable life of a gas turbine component having one or more cracks is disclosed, in which the cracks are repaired by a brazing process. The process comprises cleaning the gas turbine component, either in a fluoride ion or hydrogen environment, filling the cracks with a braze material, and heating the component through a series of four general heat treat cycles.

Additional advantages and features of the present invention will be set forth in part in a description which follows, and in part will become apparent to those skilled in the art upon examination of the following, or may be learned from practice of the invention.

BRIEF DESCRIPTION OF THE SEVERAL VIEWS OF THE DRAWINGS

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different components, combinations of components, steps, or combinations of steps similar to the ones described in this document, in conjunction with other present or future technologies.

Figure 1:
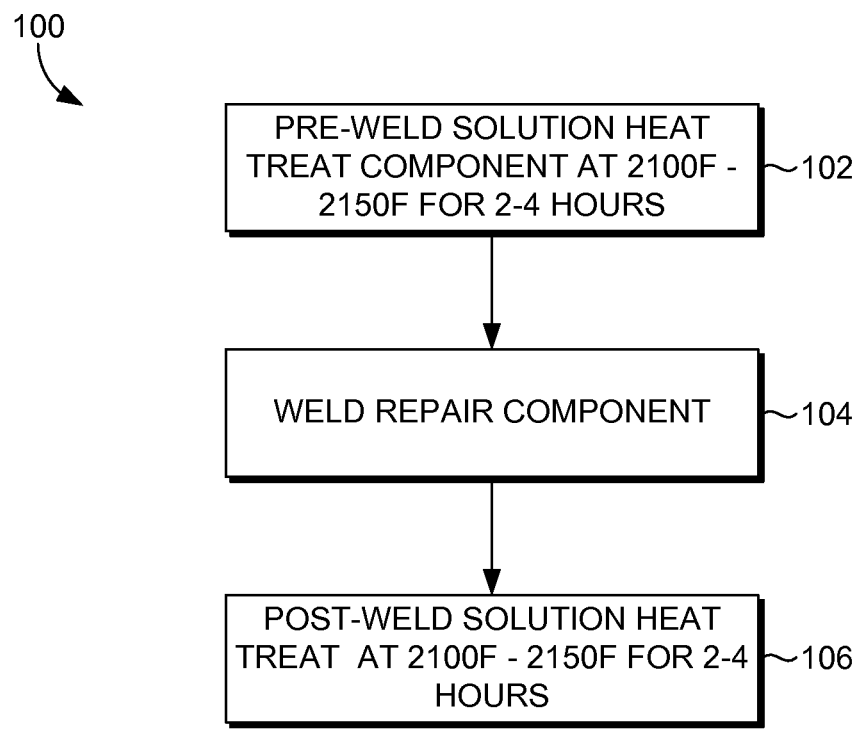
FIG. 1 depicts a flow chart of a repair process of the prior art.

It is well known that high temperatures, pressures, and vibratory conditions present in a gas turbine engine can cause cracks in various components such as turbine blades, vanes, and combustion components. Depending on the location of the cracks, these components can be reconditioned so as to extend their useful life. One such process for reconditioning a gas turbine component fabricated from a cobalt-based alloy is disclosed FIG. 1. Specifically, the reconditioning process 100 of FIG. 1 discloses a step 102 of solution heat treating the component at 2100° F.-2150° F. for 2-4 hours. In a step 104, the cracked region is weld repaired with a filler material comparable or compatible with the base material in the cracked region to close the gaps. Then, in a step 106, the repaired component undergoes a post-weld solution heat treat at 2100F-2150F for 2-4 hours. While this process can generally repair cracks, it does not serve to extend the useful life of cobalt-based alloys in a gas turbine engine beyond the current 48,000 operating hours, because after engine operation, be it the first 24,000 hours or a second 24,000 hours, the agglomerated $M_{23}C_6$ carbides form along the grain boundaries in the form of thin and thick films. In addition, many very fine and medium size $M_{23}C_6$ carbides form in the alloy, and nitrides, sulphides, and oxides form on the surfaces of the component. If the first or second weld repair were to occur, where the fine and medium size carbides were not dissolved, these $M_{23}C_6$ carbides would serve as a crack initiation sites. Also, prior repair processes of cobalt-based alloys, such as FSX-414, were limited to the temperature range defined above out of concern for grain growth and reduced mechanical properties of the alloy.

Figure 2:
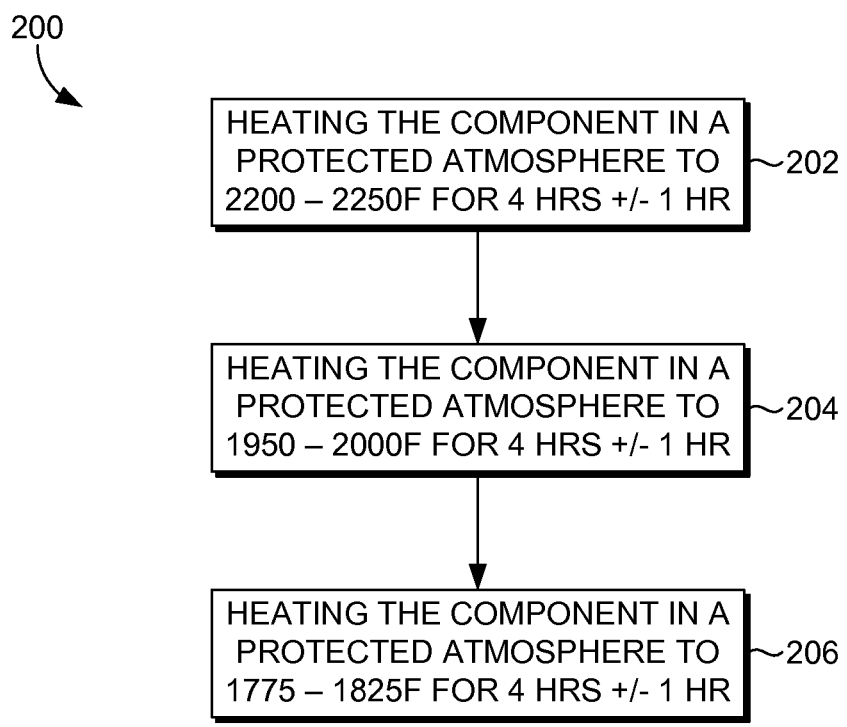
FIG. 2 depicts a flow chart of a repair process in accordance with an embodiment of the present invention.

An embodiment of the process of the present invention is depicted in FIG. 2. The present invention incorporates a rejuvenation cycle into the repair of a cobalt-based gas turbine component such as a turbine vane or nozzle similar to that shown in FIG. 4. Such a rejuvenation cycle can be utilized on turbine parts having cracks or those that are free from cracks or other defects. The process 200, depicted in FIG. 2, is directed towards extending the usable life of a turbine nozzle that is free from cracks but has reached its operating hour limit. The process 200 comprises a first step 202 of heating the component in a protected atmosphere to approximately 2200° F.-2250° F. for approximately four hours, followed by a step 204 of heating the component in a protected atmosphere to approximately 1950° F.-2000° F. for approximately four hours. Then, in a step 206, a component undergoes a third heating cycle of approximately 1775° F.-1825° F. for approximately four hours. For each of the heating cycles of steps 202-206, the duration of the time at temperature is preferably four hours, but can vary by up to one hour. The protected atmosphere in which the heat treat is conducted can be a vacuum, partial pressure, or under a gas such as argon, helium, or hydrogen, where the gas used has a purity of 99% or better.

Furthermore, while each of the steps 202-206 can be accomplished in separate heat treat cycles, the process of the present invention is designed to also be conducted in a single cycle where the repaired components remain in the protected atmosphere for the entire approximate 12 hour process and the temperature is reduced according approximately every four hours. Executing the present invention in this sequential format will save time and reduce cost by eliminating excess time required to conduct the separate heat treat cycles.

Depending on the size of the gas turbine components, furnace conditions, and available time for completing the rejuvenation cycle, an alternate embodiment of the present invention provides a process by which the total time required to complete the rejuvenation process is reduced. The gas turbine components from an industrial gas turbine engine undergoing the rejuvenation cycle tend to be rather large in size and weight, often upwards of 65 pounds each and having a wall thickness up to one inch. Therefore, when a large number of the gas turbine components of this size and weight are exposed to the temperatures of the rejuvenation cycle for the duration previously disclosed a thermal mass problem can be present, such that it can often take up to four hours to cool the component to the next temperature level. The exact cooling rate when cooled through conduction depends on a number of factors such as the size of the furnace, number of components in the furnace, and the relative mass of the components.

It is desirable to aid the cooling process of components undergoing the rejuvenation cycle, so as to reduce the overall processing time and return the components to service quicker. One way to reduce the time required to complete the rejuvenation cycle is to actively cool the components through convection by blowing argon gas into the protected atmosphere. In some applications, this can take a set of gas turbine components from 2200° F.-2250° F. down to approximately 500° F. in about 45 minutes. Cooling the components to approximately 500° F. is not necessary from a metallurgical perspective since all of the metallurgical changes occur by approximately 1000° F. However, by reducing the component temperature to below approximately 500° F., an operator can open the furnace door safely if necessary to access the components in between heating cycles.

Figure 3:
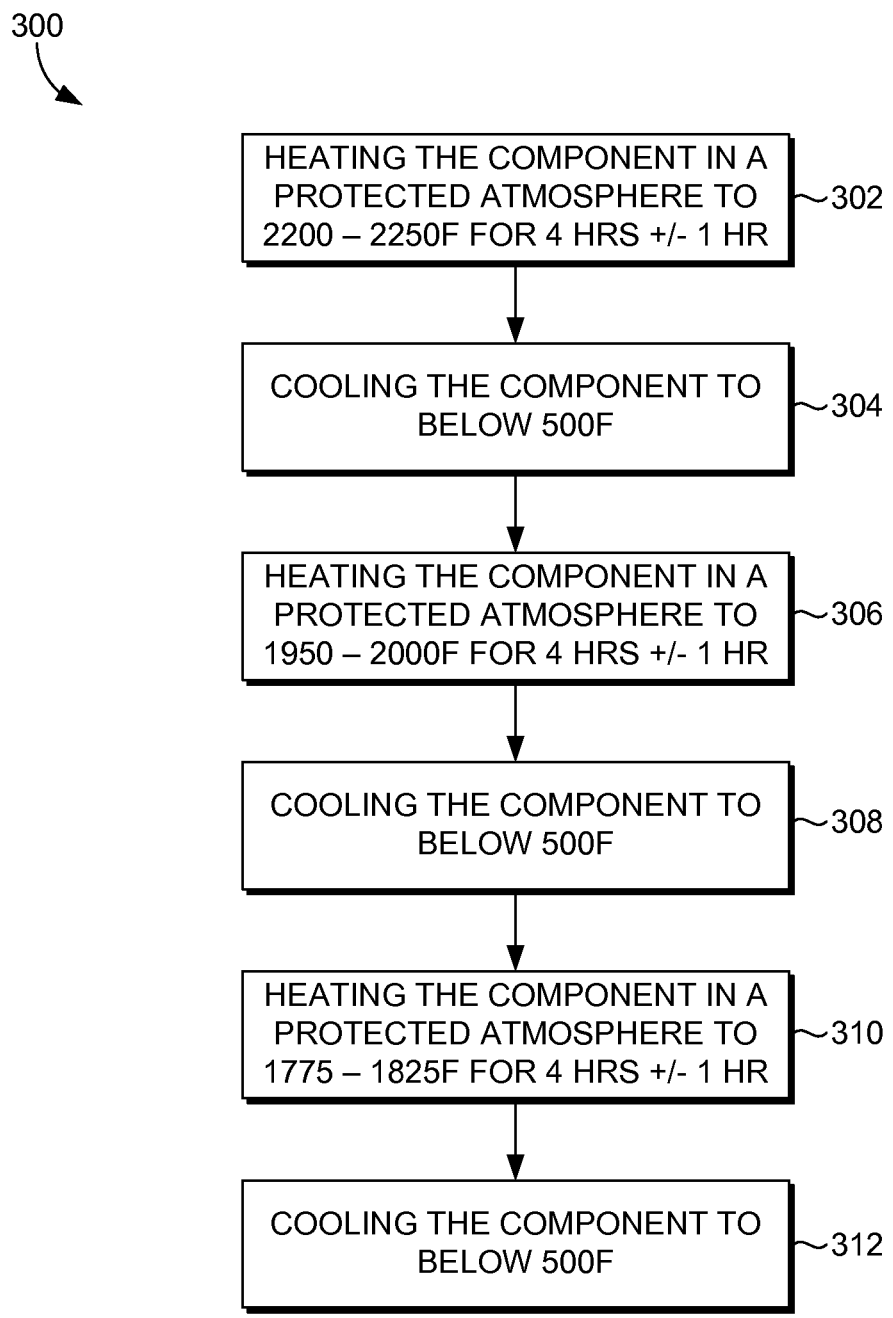
FIG. 3 depicts a flow chart of a repair process in accordance with an alternate embodiment of the present invention.

Referring to FIG. 3, an alternate rejuvenation process 300 incorporating cooling cycles to approximately 500° F. is disclosed. In a step 302, the gas turbine component is heated in a protected atmosphere to approximately 2200° F.-2250° F. for approximately four hours+/− one hour. In a step 304, the gas turbine component is cooled to below approximately 500° F. After the part has been cooled, the component is then heated in a step 306 in the protected atmosphere to 1950° F.-2000° F. for approximately four hours+/− one hour. In a step 308, the component is then again cooled to below approximately 500° F. Then, in a step 310, the component is heated in a protected atmosphere to approximately 1775° F.-1825° F. for approximately four hours±one hour. Then, in a step 312, the component is again cooled to below approximately 500° F.

Figure 4:
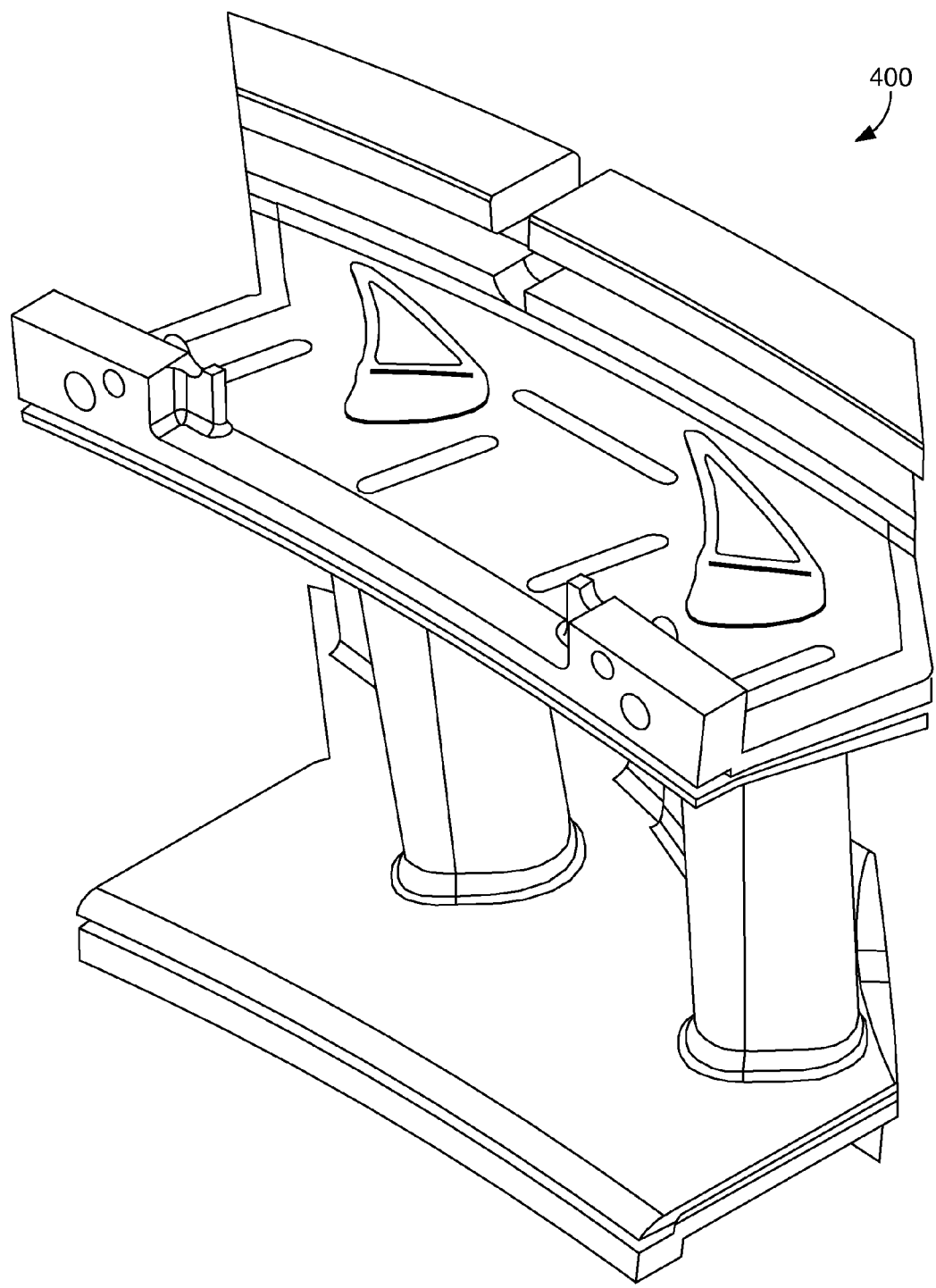
FIG. 4 depicts a perspective view of a gas turbine vane utilizing an embodiment of the present invention.
Figure 5:
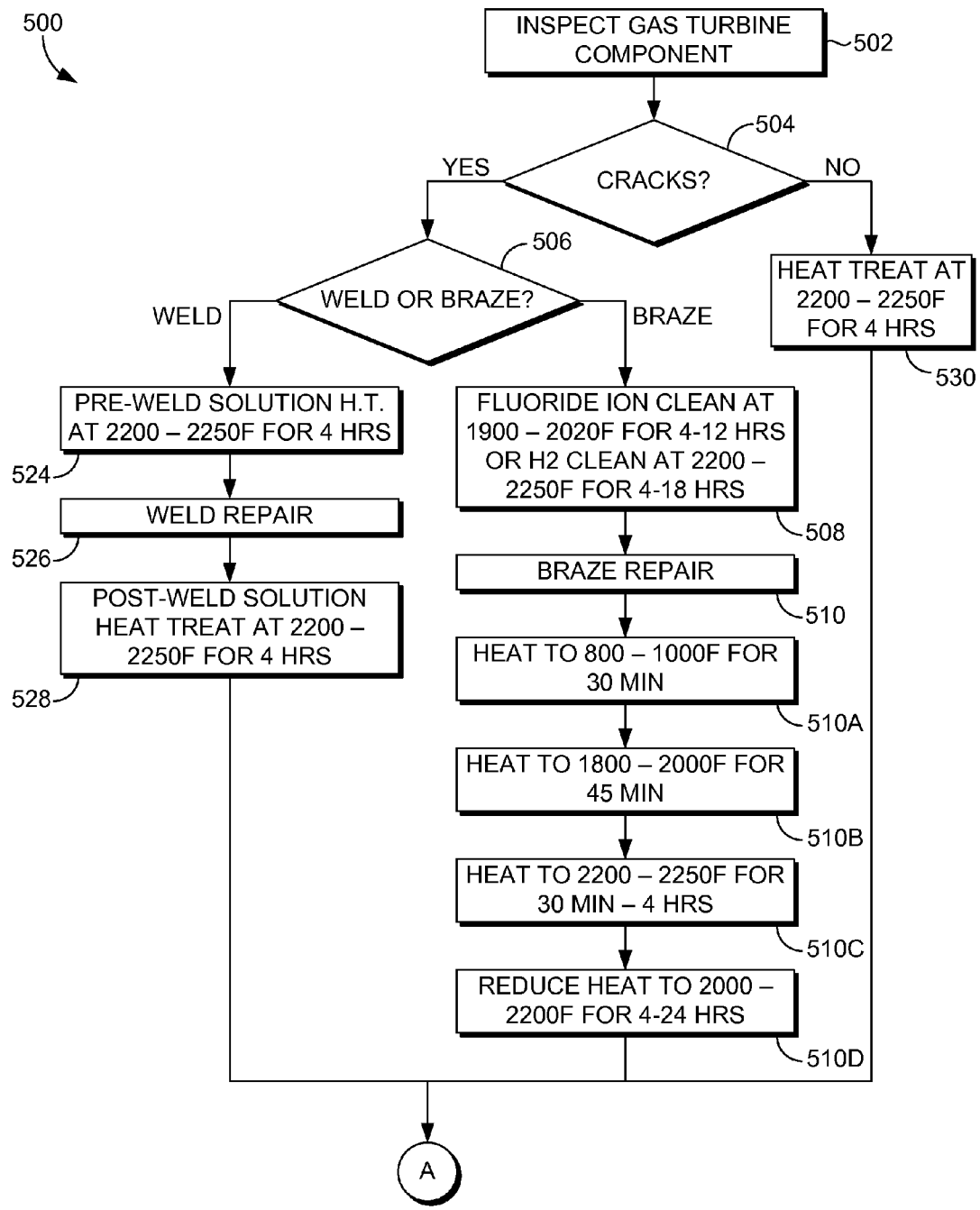
FIG. 5 is a flow chart of a repair process in accordance with yet another alternate embodiment of the present invention.
Figure 5:
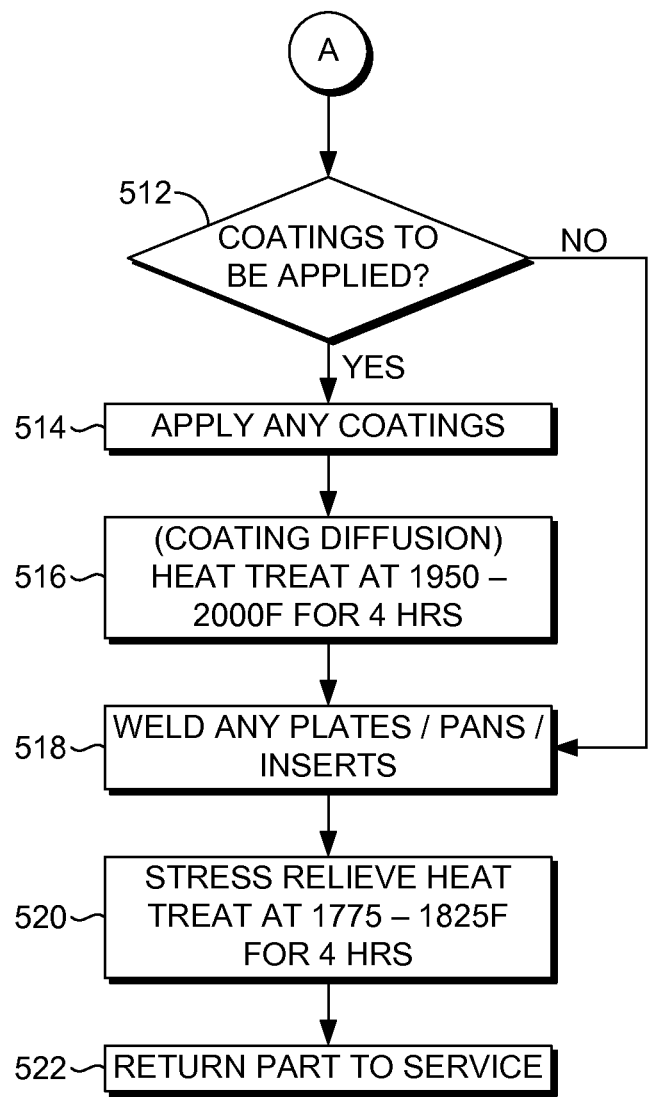

The rejuvenation process disclosed herein can also be applied to gas turbine components having defects, such as cracks, that require reconditioning. A series of reconditioning and rejuvenation processes 500 are depicted in FIG. 5. Specifically, in a step 502, a gas turbine component, such as the turbine vane 400 of FIG. 4, having reached the end of its service life, is inspected for defects. In a step 504, a determination is made whether or not the component has any cracks capable of being repaired. If there are repairable cracks in the gas turbine component, then a determination is made in a step 506 as to the preferred crack repair method: weld repair or braze.

Where the gas turbine component is to be repaired by a brazing process, the component is initially cleaned in a step 508. The part is cleaned in order to remove oxides, nitrides, and sulphides from the cracks so that brazing will be successful. Cleaning options can vary, but one option includes placing the component in a fluoride ion environment at a temperature of approximately 1900° F.-2050° F. for approximately 4-12 hours. Alternatively, the cleaning of the gas turbine component can occur in a hydrogen environment at a slightly higher temperature of approximately 2200° F.-2250° F. for approximately 4-18 hours.

Once the gas turbine component has been cleaned and the oxides, sulphides, and nitrides removed from the cracks, the cracked regions are filled with an acceptable braze material, such that when heated the filler material will adequately bond to the surrounding base metal. For components fabricated from a cobalt-based alloy such as FSX-414, an acceptable braze filler material is a superalloy powder such as X-40 or MarM509 mixed with braze powder such as AMS 4783 (Co-0.4C-19Cr-8Si-4W-17Ni) or Amdry 788 (from Sulzer Metco (Co-22Cr-21Ni-14W-2B-2Si-0.03La)). There are numerous Co-based superalloys that can be mixed with a variety of braze filler metals to successfully repair cracks. The braze repair process is completed in a step 510, including a step 510A, where the component having the braze filler material is heated to 800° F.-1000° F. for approximately 30 min in order to burn the binders from the braze filler metal, and then in a step 510B, the component is heated to 1800° F.-2000° F. for approximately 45 minutes in order to stabilize the furnace load below the solidus temperature of the braze filler metal. Then, in a step 510C, the component is heated to a brazing temperature of 2200° F.-2250° F. for approximately 30 minutes to 4 hours in order to melt the braze material to fill the cracked area. Once the filler material is brazed, the heat applied to the component is reduced to 2000° F.-2200° F. and the temperature is held for approximately 4 hours-24 hours in a step 510D to form the desired microstructure with an ideal morphology and distribution of intermetallic phases, such as boride phases, silicide phases, and phosphide phases. After brazing, the component is subjected to a series of heat treat cycles Depending on the type of turbine component and temperatures to which the turbine component is exposed during operation, the component may require a coating to be applied to its external surface, such as a thermal barrier coating. A thermal barrier coating reduces the temperature to which the gas turbine component is exposed by providing a form of insulation to the gas turbine component which allows the turbine component to operate at a higher temperature. One such thermal barrier commonly used on the airfoil surface of a turbine vane, such as that pictured in FIG. 4, is a Yttria Stabilized Zirconia coating. The ceramic thermal barrier coating is not deposited directly onto the component, but rather a MCrAlY coating (where M=Ni, Co, or Fe), commonly referred to as a bond coating is applied to the airfoil surface first and a ceramic yttria stabilized top coating applied to/above the bond coating.

In a step 512, a determination is made whether any type of coating is to be applied to the turbine component. Should the repaired component require a coating, the coating is applied in a step 514, and after the coating is applied, and in a step 516, the turbine component undergoes a diffusion heat treatment in a protected atmosphere at approximately 1950° F.-2000° F. for approximately four hours. The protected atmosphere is preferably a vacuum, argon gas, or helium gas. This heat treatment is the second step of the rejuvenation process.

Figure 6:
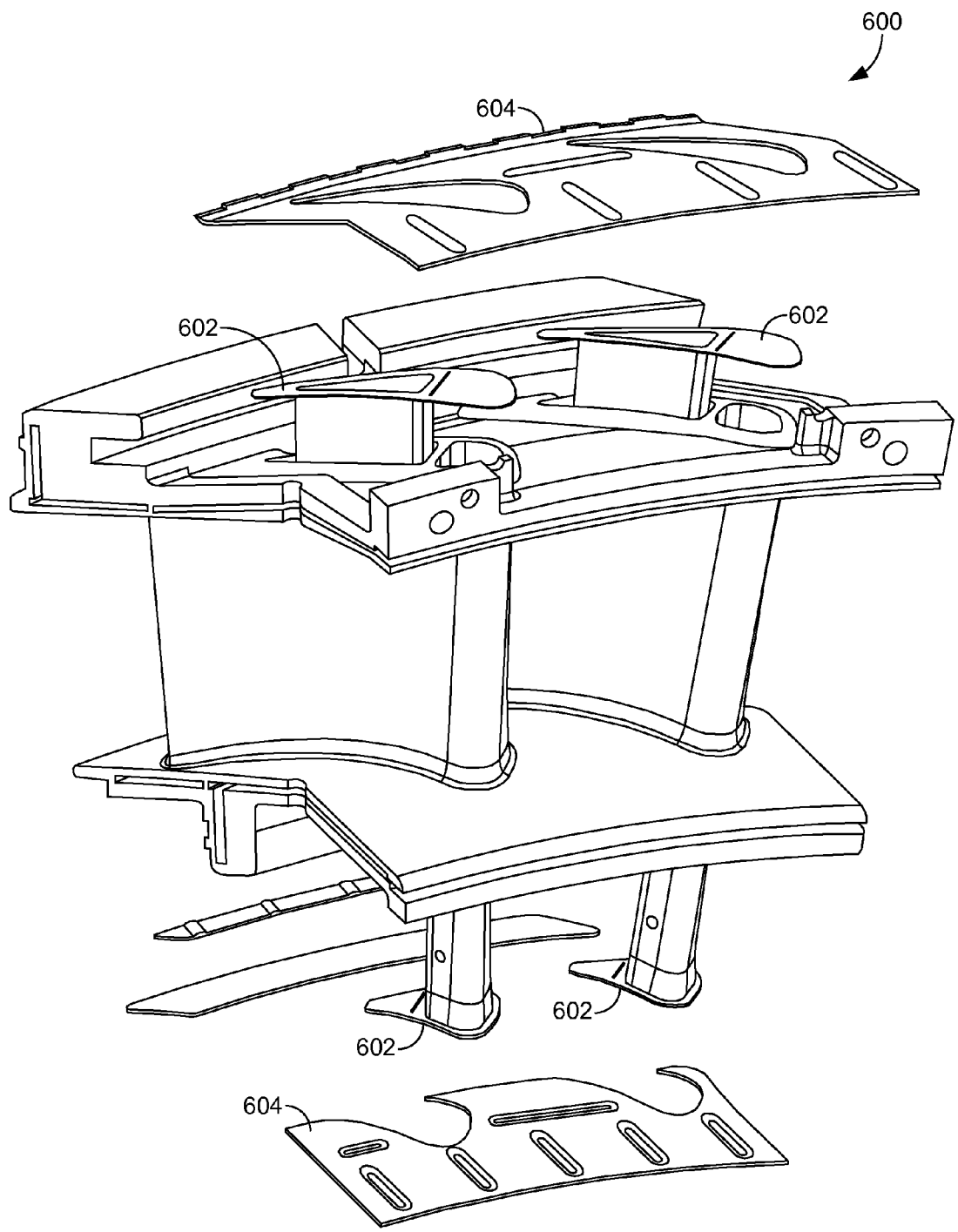
FIG. 6 depicts an exploded view of a gas turbine vane utilizing an embodiment of the present invention.

Referring to FIG. 6, another feature common of gas turbine vanes 600 is a series of metering plates, inserts, and pans that are fixed to radially inner and outer surfaces of the vane. In addition to, or in lieu of, the airfoil coating described above, gas turbine components such as turbine blades and vanes are typically cooled, either with air or another fluid, such as steam. The cooling fluid passes through the internal passages of the component thus reducing thermal stresses and lowering the overall operating temperature. In order to restrict the amount of cooling fluid passing into the component 600 and help direct the path of the cooling fluid, one or more inserts 602, pans 604, and/or meterplates (not shown) are secured, in a step 518, to the component 600, typically by welding, but occasionally brazing is utilized.

In order to prevent these welded areas from cracking due to thermal and mechanical stresses, the component undergoes a stress relieve in a step 520, where the stress relieve occurs in a protected atmosphere at approximately 1775° F.-1825° F. for approximately four hours. This process, while serving to stress relieve any welds, also serves as a third and final heat treatment of the rejuvenation process. Then, in a step 522, the turbine component can be returned to service. As previously discussed, a turbine component fabricated from the cobalt-based FSX-414 alloy, undergoing a repair and rejuvenation process as outlined above, will be able to operate for at least one more repair interval, or upwards of an additional 48,000 hours.

If in the step 506 a determination is made to weld repair instead of braze repair, then, in a step 524 the component undergoes a pre-weld heat treat in a protected atmosphere at approximately 2200° F.-2250° F. for approximately four hours. The pre-weld heat treat serves to prepare the surface of the component to be repaired by removing any oxides from the cracks. Then, in a step 526, the component undergoes a weld repair where a weld filler of compatible material and/or properties to that of the component is used to fill the cracked areas. After welding closed any cracks and upon successful inspection of the repaired areas, the component undergoes a second heat treatment in a step 528 in a protected atmosphere at 2200° F.-2250° F. for approximately four hours. This is the first step in the rejuvenation process.

After the post weld heat treat of step 528, the remaining process of the weld repair mirrors the braze repair process previously discussed, where in a step 512 a determination is made as to whether a coating is to be applied. If one or more coatings are to be applied, then the coatings are applied in the step 514 and, as previously discussed, the component undergoes a diffusion heat treat in the step 516 where the coated component is heated for approximately four hours at approximately 1950° F.-2000° F. in a protected atmosphere such as a vacuum, argon gas, or helium gas. Thereafter, in a step 518, should the component have a series of inserts, pans, or meterplates, those additional parts are welded in place, and then the component is stress relieved in the step 520, by heating the component to approximately 1775° F.-1825° F. for approximately four hours. Depending on the heating conditions and should there not be a need to weld any parts in the step 518, the heating of steps 516 and 520 may be accomplished sequentially. After the last heat treat in the step 520, the component can be returned to service in the step 522. As with the brazing process previously discussed, if no coating is required in the step 512, the process moves to the steps 518-522.

If in the step 504, no cracks are found, the component undergoes the rejuvenation process, either as disclosed in FIG. 2 or a modified version as shown in FIG. 5. In a step 530, the component undergoes an approximate four hour heat treat at 2200° F.-2250° F. and then the process returns to the step 512 where a determination is made whether any coatings are to be applied to the component. If a coating is to be applied, they are applied to the desired surfaces of the component in a step 514. Once any coatings are applied, or should there not be a coating applied, the process moves to a step 516, where the component undergoes a heat treat at approximately 1950° F.-2000° F. for approximately four hours. Then, in a step 518, any plates, pans, or inserts like those shown in FIG. 6, are welded to the component. In a step 520, the component is heat treated to approximately 1775° F.-1825° F. for approximately four hours to stress relieve the welds of the step 518.

Figure 7:
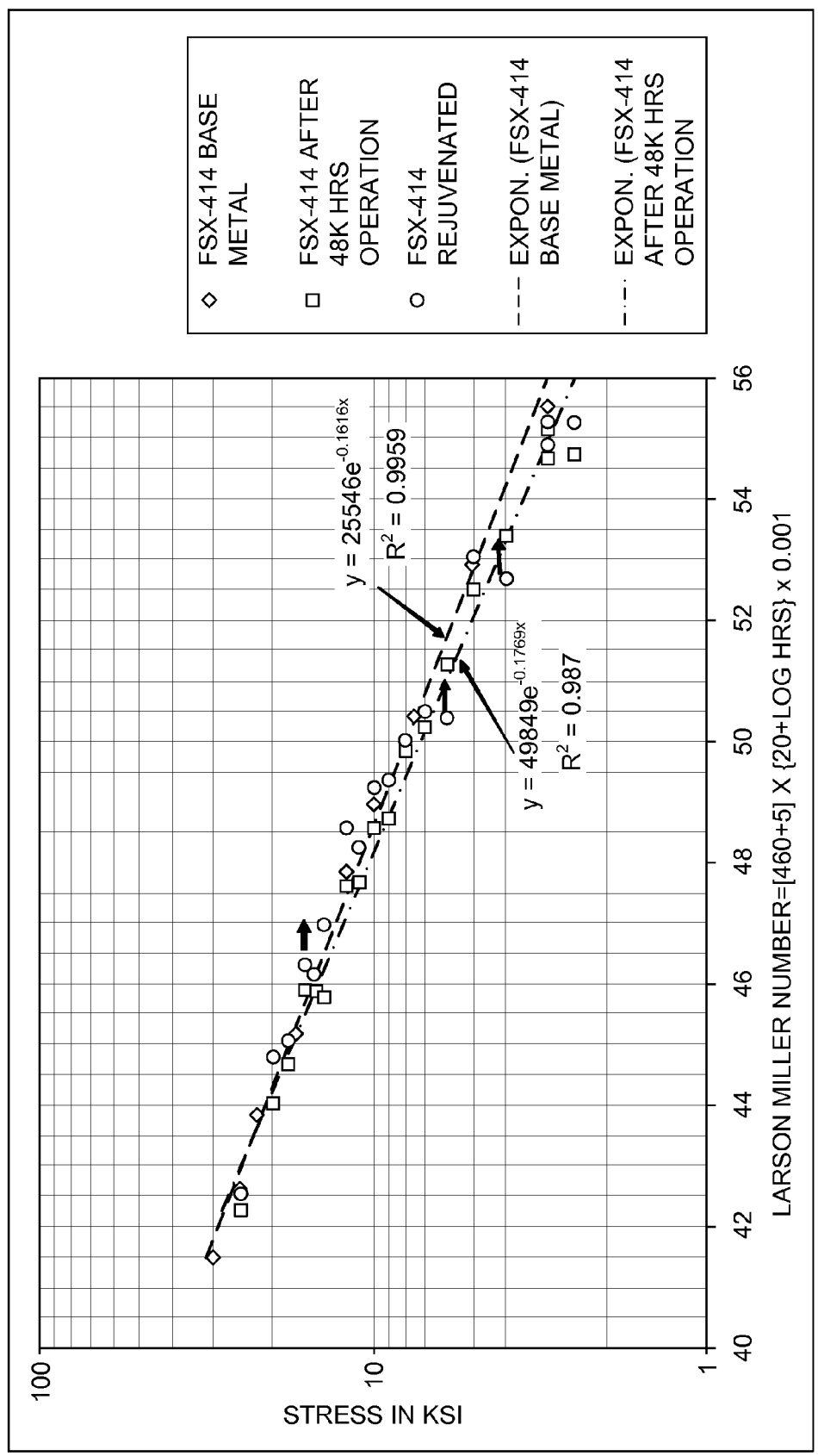
FIG. 7 is a chart depicting the improvement in component life resulting from the rejuvenation process for given temperature and stress levels.

The application of a three-part rejuvenation cycle includes heating the component in a protected atmosphere to approximately 2200° F.-2250° F. for approximately four hours, then heating the component to approximately 1950° F.-2000° F. for approximately four hours, and then to heating the component to approximately 1775° F.-1825° F. for approximately four hours. The series of heat treatments improves the overall capability of the turbine component by providing additional life to the FSX-414 alloy after the component has reached its previously-determined usable life of 48,000 hours. For example, with reference to Table 1 below and FIG. 7, the improved time for stress rupture (hours to failure) at different temperatures and stress are shown for a cobalt-based alloy having undergone the rejuvenation process after operating for 48,000 hours at temperature and pressure compared to the same alloy that did not undergo the rejuvenation process. Note in FIG. 7 that the three data points having arrows indicate that the sample had not yet failed. The data listed in Table 1, was collected by taking material coupons of FSX-414 from turbine vanes having run 48,000 hours and either exposing the coupons to the stress and temperature listed and recording time until failure or performing the rejuvenating cycle on the coupons and then exposing the rejuvenated coupons to the stress and temperature listed and recording the time until failure.

TABLE 1

| Stress Rupture Parameters | Hours to Failure (2 service intervals: Approx. 48,000 hours) | Hours to Failure (2 service intervals: Approx. 48,000 hours + Rejuvenation Cycle) |
| --- | --- | --- |
| 1500 F./25 ksi | 36.3 | 49.7 |
| 1500 F./20 ksi | 289 | 697.2 |
| 1600 F./18 ksi | 49 | 74.3 |
| 1600 F./15 ksi | 187.6 | 253.3 |
| 1600 F./12 ksi | 1289 | 3800.3 |
| 1700 F./14 ksi | 15.7 | 55.1 |
| 1700 F./10 ksi | 304 | 623 |
| 1800 F./11 ksi | 12.6 | 21.9 |
| 1800 F./8 ksi | 113.1 | 132.9 |
| 1900 F./9 ksi | 4.4 | 8.2 |
| 1900 F./5 ksi | 176.8 | 300.9 |
| 1900 F./2.5 ksi | 1525.5 | 2534.9 |
| 2000 F./7 ksi | 2.6 | 3.3 |
| 2000 F./3 ksi | 256.8 | 289.1 |
| 2000 F./3 ksi | 164.2 | 204.7 |

Referring to Table 1 above, a material coupon from a component having run 48,000 hours and not undergoing the rejuvenation process can operate for 1289 hours at 1600F and 12 ksi before rupturing. The same material coupon that underwent the rejuvenation process discussed herein is capable of undergoing the same stress and temperature for approximately three times as long (3800 hours) before failing. This improvement is shown graphically in FIG. 7 in the well-known format of a Larson-Miller curve, where stress is plotted versus a Larson-Miller number for each data sample (rejuvenated and non-rejuvenated coupons). The Larson-Miller number is a function of temperature multiplied by a logarithmic of the hours operated at the stress and temperature. For each of the components having undergone the rejuvenation process, an increase in component life is achieved as evidenced by the data in Table 1 and shown in FIG. 7. Given that the expected operating temperatures and stress levels of the 1$^{st}$ stage Frame 7FA vane are approximately 800F-1900F and the stress levels are 5 ksi-60 ksi, the rejuvenation process increases the hours to failure by at least 50% for each of the stress rupture parameters listed hence allowing at least one more service interval of 24,000 hours of operation.

The rejuvenation process has been discussed in general with respect to a cobalt-based alloy, such as FSX-414, X-40, X-45, and WI-52. The precise rejuvenation process required to extend the usable life of a gas turbine component is alloy specific. That is, the process outlined above would apply to the cobalt-based alloy FSX-414 and other alloys having a similar composition such as X-40 and X-45 since the carbides that form in X-40 and X-45 are similar to those that form in FSX-414. However, variations to the heat treat processes would be required for other cobalt-based alloys.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and within the scope of the claims.

What is claimed is:

1. A method of extending a useable life of a cobalt-based gas turbine component comprising:
   cleaning the gas turbine component;
   filling cracks in the gas turbine component with a braze material;
   heating the component in a protected atmosphere to a first holding temperature range of 800° F.-1000° F. for approximately 30 minutes;
   heating the component in the protected atmosphere to a second holding temperature range of 1800° F.-2000° F. for approximately 45 minutes, wherein heating the component to the second holding temperature range is preceded directly by a first heat cycle having the first holding temperature range and a ramp up period from the first holding temperature range to the second holding temperature range;
   dissolving carbides agglomerated on the component to limit the carbides from forming crack initiation sites by heating the component in the protected atmosphere a third holding temperature range of to 2200° F.-2250° F. for approximately 30 minutes to 4 hours, wherein heating the component to the third holding temperature range is preceded directly by a second heat cycle having the second holding temperature range and a ramp up period from the second holding temperature range to the third holding temperature range;
   reducing heat to the component in the protected atmosphere to a fourth holding temperature range of 2000° F. to 2200° F. for approximately 4 hours to approximately 24 hours, wherein reducing heat to the fourth holding temperature range is preceded directly by a third heat cycle having the third holding temperature range and a ramp down period from the third holding temperature range to the fourth holding temperature range.

2. The method of claim 1, wherein the cleaning of the gas turbine component occurs in a fluoride ion environment where the component is heated to approximately 1900° F.-2020° F. for approximately 4 hours to approximately 12 hours.

3. The method of claim 1, wherein the cleaning of the gas turbine component occurs in a hydrogen environment where the component is heated to approximately 2200° F.-2250° F. for approximately 4 hours to approximately 18 hours.

4. The method of claim 1 further comprising applying a coating to the gas turbine component prior to heating the component to approximately 1950° F.-2000° F.

5. The method of claim 4 further comprising welding one or more plates to the gas turbine component.

6. The method of claim 5, wherein the one or more plates are welded to the component after the coating is applied to the component.

7. The method of claim 1, wherein heating related steps are preformed sequentially without the component being removed from a furnace.

8. A method of extending a useable life of a cobalt-based gas turbine component comprising:
   cleaning the gas turbine component, wherein cleaning comprises removing one or more of oxides, nitrides, and sulphides from cracks in the gas turbine component;
   filling the cracks in the gas turbine component with a braze material;
   burning binders from the braze material by heating the component in a protected atmosphere to a first holding temperature range of 800° F.-900° F. for approximately 30 minutes;
   stabilizing the component below a solidus temperature of the braze material by heating the component in the protected atmosphere to a second holding temperature range of 1800° F.-1900° F. for approximately 45 minutes;
   dissolving clusters of $M_{23}C_6$ carbides on the component by heating the component in the protected atmosphere to a third holding temperature range of 2200° F.-2250° F. for approximately 30 minutes to 4 hours to limit the $M_{23}C_6$ carbides from forming crack initiation sites; and
   forming a microstructure in the component by reducing heat to the component in the protected atmosphere to a fourth holding temperature range of 2100° F. to 2200° F. for approximately 4 hours to approximately 24 hours, wherein the microstructure includes an ideal structure and distribution of intermetallic phases, wherein reducing heat to the fourth holding temperature range is preceded directly by a ramp down period from the third holding temperature range to the fourth holding temperature range.

\* \* \* \* \*